United States Patent
Lehman

(10) Patent No.: US 8,369,812 B2
(45) Date of Patent: Feb. 5, 2013

(54) METHOD AND SYSTEM FOR DETECTION OF PASSIVE INTERMODULATION INTERFERENCE EMISSIONS

(75) Inventor: Bob Lehman, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 773 days.

(21) Appl. No.: 12/366,412

(22) Filed: Feb. 5, 2009

(65) Prior Publication Data

US 2009/0239475 A1 Sep. 24, 2009

Related U.S. Application Data

(60) Provisional application No. 61/038,316, filed on Mar. 20, 2008.

(51) Int. Cl.
H04B 1/10 (2006.01)
(52) U.S. Cl. .......................... 455/295; 455/230
(58) Field of Classification Search ........... 455/230–295
See application file for complete search history.

(56) References Cited

U.S. PATENT DOCUMENTS

| | | | |
|---|---|---|---|
| 6,144,692 A | 11/2000 | Beck | |
| 6,526,260 B1 | 2/2003 | Hick et al. | |
| 6,766,262 B2 | 7/2004 | Martens | |
| 7,231,311 B2 | 6/2007 | Verspecht | |
| 2002/0094785 A1 | 7/2002 | Deats | |
| 2008/0039045 A1 | 2/2008 | Filipovic et al. | |

FOREIGN PATENT DOCUMENTS

EP 1067698 1/2001

OTHER PUBLICATIONS

Christianson et al., "Higher Order Intermodulation Product Measurement of Passive Components", "IEEE Transactions on Microwave Theory and Techniques", Jul. 2008, pp. 1729-1736, vol. 56, No. 7, Publisher: IEEE.
"Passive Intermodulation Measurement Techniques", "www.summitekinstruments.com", May 1999, Publisher: Summitek Instruments, Published in: Englewood CO.

Primary Examiner — Lincoln Donovan
Assistant Examiner — Diana J Cheng
(74) Attorney, Agent, or Firm — Fogg & Powers LLC

(57) ABSTRACT

A method and system for detecting intermodulation emissions, such as passive intermodulation emissions, is provided. The method comprises retrieving signal quality measurement (SQM) data, and determining whether there is an intermodulation hit in the SQM data. If there is no intermodulation hit, the SQM data is stored in a first data set; if there is an intermodulation hit, the SQM data is stored in a second data set. The method then determines whether there are one or more faults in the first data set. If there are, a confirmation count for an intermodulation failure is cleared, and the method starts again. If there are not one or more faults in the first data set, a determination is made whether there are one or more faults in the second data set. If not, the confirmation count is cleared, and the method starts again. An intermodulation failure can be confirmed if there are one or more faults in the second data set.

20 Claims, 3 Drawing Sheets

METHOD AND SYSTEM FOR DETECTION OF PASSIVE INTERMODULATION INTERFERENCE EMISSIONS

CROSS-REFERENCE TO RELATED APPLICATION

The present application claims the benefit of priority to U.S. Provisional Application Ser. No. 61/038,316, filed on Mar. 20, 2008, which is incorporated herein by reference.

BACKGROUND

Radio frequency (RF) communication systems, such as aeronautical satellite communications, produce active intermodulation (IM) or passive intermodulation ((P)IM) emissions whenever two or more signals at different frequencies are transmitted simultaneously. The (P)IM emissions, which are caused when physical parts begin to degrade, can generate harmful interference to other radio receivers on the same or nearby aircraft, such as receivers in satellite navigation systems. To manage or prevent such interference (for which there often are regulatory requirements), many techniques have been employed, and a built-in test (BIT) may be required to verify compliance with regulatory requirements.

One test technique for monitoring such emissions is to transmit two (or more) test signals simultaneously at different pre-determined frequencies and then measure RF signal energy within a certain bandwidth around one or more pre-determined receive frequencies that correlate to certain IM product orders (3rd, 5th, 7th, etc.) that result from the transmit frequencies. Prior approaches have included manual or automated testing involving the transmission of multiple simultaneous time-continuous test signals (typically two, and typically continuous wave (CW)), then measuring with a spectrum analyzer (or an embedded digital signal processor equivalent) for (P)IM signals above the noise floor at the pre-determined frequencies of the various (P)IM products. The measurements are compared to regulatory requirements, nominal performance levels, or other pre-determined performance levels in order to determine whether or not a (P)IM problem exists. The simultaneity of the test transmissions is guaranteed.

Rather than transmit specific test signals, multiple normal operation transmissions can be used at different frequencies to continuously monitor the (P)IM emissions of a system. However, as (P)IM only occurs when the multiple transmissions occur simultaneously, the (P)IM test measurements must normally be done when the transmissions are known to be occurring simultaneously, and then compared to measurements taken when transmissions are known to not be occurring simultaneously, in order to determine that interference emissions are occurring and that they are in fact due to (P)IM.

Moreover, there are problems with trying to use normal operation transmissions for any such testing, including on/off bursting of the transmit frequencies at non-predictable random or pseudo-random time intervals, which can be of very short on-time duration, thus making the determination of exactly when simultaneous transmissions are occurring very difficult, if not impossible, to predict in advance. The inherent burstiness of some such transmit channels can make it impossible to have simultaneous transmission occur for a long-enough period to arrange for test measurements to be made during the time of simultaneity. This situation can be exacerbated by the specific system architecture, which may involve multiple hardware units interconnected by relatively low speed communications interfaces for built-in test and/or normal operations data, which further reduces the possibility of being able to coordinate test measurement sampling to occur at the required times of simultaneity.

As a result of these obstacles, system designers may be forced to follow the multiple test signal approach, with its probable higher implementation costs, requirement for dedicated time periods for test execution, reservation of RF spectrum for the test transmissions, possible reservation of RF spectrum for "quiet" receive test frequencies, restrictions on the effective isotropic radiated power (EIRP) levels of the test transmissions (which may depend on the direction that the test signal power is radiated relative to satellites or other signal receivers), and the like.

SUMMARY

The present invention relates to a method and system for detecting intermodulation emissions such as passive intermodulation emissions. The method comprises retrieving signal quality measurement (SQM) data, and determining whether there is an intermodulation hit in the SQM data. If there is no intermodulation hit, the SQM data is stored in a first data set; if there is an intermodulation hit, the SQM data is stored in a second data set. The method then determines whether there are one or more faults in the first data set. If there are one or more faults in the first data set, a confirmation count for an intermodulation failure is cleared, and the method starts again. If there are not one or more faults in the first data set, a determination is made whether there are one or more faults in the second data set. The confirmation count is cleared if there are not one or more faults in the second data set, and the method starts again. An intermodulation failure can be confirmed if there are one or more faults in the second data set.

BRIEF DESCRIPTION OF THE DRAWINGS

Features of the present invention will become apparent to those skilled in the art from the following description with reference to the drawings. Understanding that the drawings depict only typical embodiments of the invention and are not therefore to be considered limiting in scope, the invention will be described with additional specificity and detail through the use of the accompanying drawings, in which.

DETAILED DESCRIPTION

Figure 1:
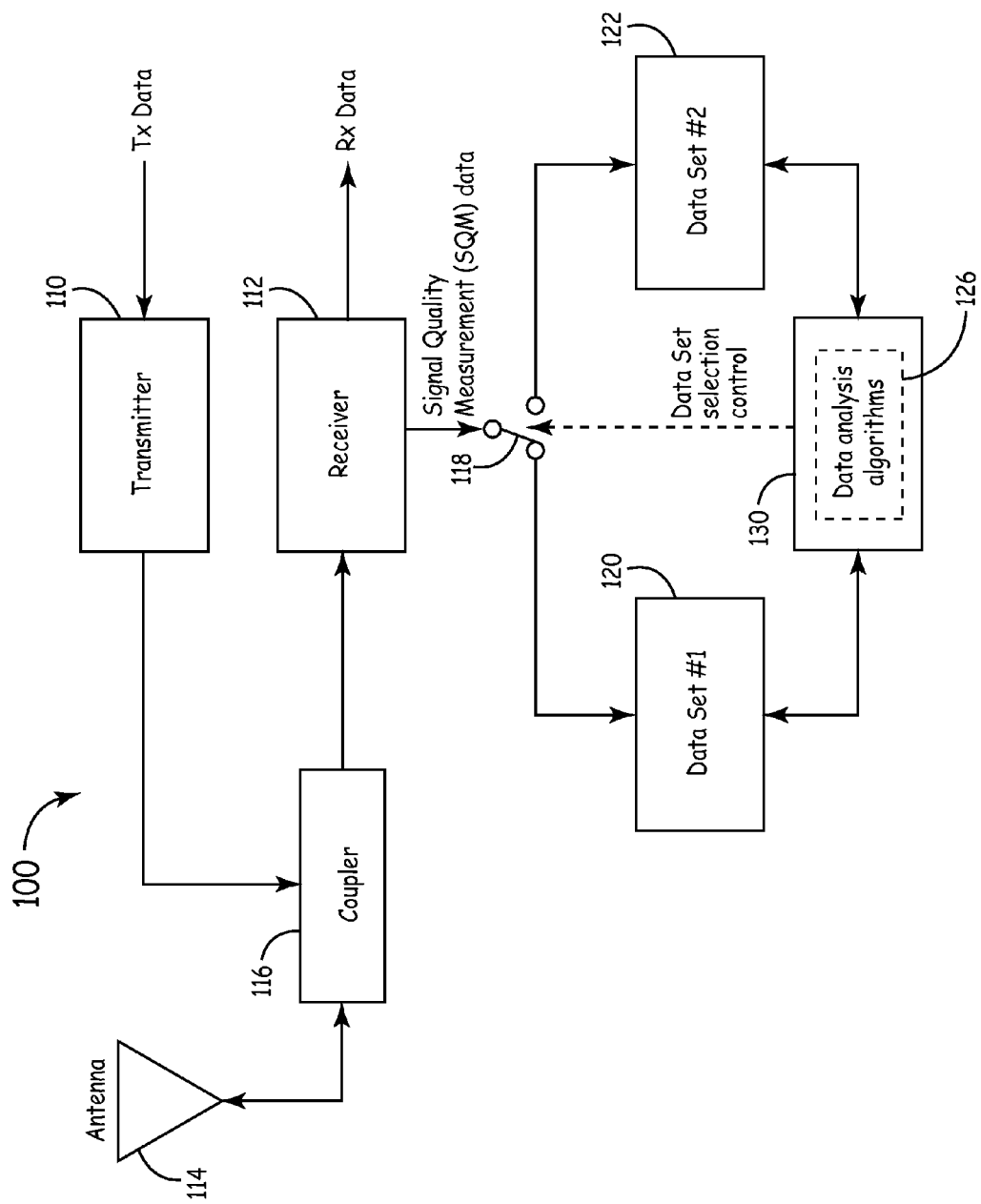
FIG. 1 is a block diagram of a system used to implement the techniques of the present invention according to one embodiment.

In the following detailed description, embodiments are described in sufficient detail to enable those skilled in the art to practice the invention. It is to be understood that other embodiments may be utilized without departing from the scope of the present invention. The following detailed description is, therefore, not to be taken as limiting.

The present invention is directed to a method for detection of intermodulation interference emissions, such as passive intermodulation ((P)IM) interference emissions, without a priori knowledge of the times of simultaneous multiple transmit frequencies. In general, the present method splits signal quality measurement (SQM) data into two data sets, and subsequent data processing is employed to either invalidate the data sets and restart the process, or else make a preliminary determination that PIM beyond pre-determined threshold levels probably exists. A confirmation process then checks to see whether the preliminary determination persists for a minimum pre-determined criterion, such as a minimum number of iterations of an algorithm or a pre-determined period of time.

The present method eliminates the need for test transmissions by utilizing multiple normal operation transmit (Tx) channels for a background-mode continuous-monitoring test. The method also eliminates the need for advance arrangement or knowledge of the multiple channel transmissions being simultaneous over a given time duration. The present technique can be implemented within system hardware and/or software by virtue of appropriate real-time data sorting and after-the-fact data analysis.

The present approach employs a unique statistical analysis of continuous-monitoring measurements of one or more signal quality/figure-of-merit parameters of a normal receive (Rx) channel, such as carrier-to-noise density ratio ($C/N_o$), bit/frame/superframe sync, raw or net physical layer bit error rate (BER), data link or network layer cyclic redundancy code (CRC) check, etc. The present method also provides for storing and analyzing two sets of continuous-monitoring measurements over multiple common discrete time intervals.

While the description herein is directed to detection of (P)IM emissions, it should be understood that the present method is also applicable to detection of active intermodulation (IM) emissions.

In the present approach, a first set of data measurements is stored whenever a mathematical computation of the possible set of low-order, relatively high amplitude (P)IM products from all current Tx frequencies (or a particular subset of those frequencies, e.g., those exceeding a minimum threshold EIRP level) indicates that no such (P)IM products fall within a given bandwidth around the nominal receive frequency chosen for monitoring. Assuming a properly-operating system, most if not all of the data in this first set of measurements would be expected to be "good" as defined by pre-determined criteria for the chosen parameter(s) being monitored. If this set of data contains any statistically significant number of "bad" measurements, the cause must be assumed to be something other than (P)IM.

A second set of measurements is stored whenever the same mathematical computation indicates that one or more (P)IM products could fall within a given bandwidth around the nominal Rx frequency chosen for monitoring. The data stored in this second set of measurements will sometimes include measurements that took place during times of simultaneous transmissions that may have produced the possible (P)IM emissions, and other measurements that took place during times of no transmission, or single-channel transmission, or multiple channel transmission whose low-order (P)IM products do not actually fall within the given bandwidth of the monitored Rx frequency.

For every given discrete time interval (depending on Rx frequency parameter sampling rate and memory capacity, e.g., 30 minutes), the stored signal quality parameter(s) in the two sets of measurements are statistically analyzed. If the first data set contains any significant number of "bad" parameters, all data for that time interval is discarded, because the Rx signal degradation cannot be attributed to (P)IM. If instead, the data from the first set contains no significant number of "bad" parameters, but the second data set contains any "bad" parameters, then this can be taken as indirect evidence of significant levels of (P)IM. Such a determination is declared to be a (P)IM fault, subject to confirmation.

Additional data processing may be required for practical management of the data collected, e.g., averaging, reduction, etc. The present process continues through ongoing discrete time interval iterations. If (P)IM faults continue to be declared beyond a given confirmation criteria (e.g., "bad" results in the second set of measurements for n consecutive discrete time intervals, n being selectable, e.g., 4), then a (P)IM failure is logged, indicated, reported, etc., annunciating the need for corrective maintenance action.

The present method can be implemented for an aircraft by modifying conventional avionics software protocols to add appropriate logic steps to perform the method. Exemplary avionics software include the Honeywell/Thales MCS-7200 SD-720 satellite data unit (SDU) main processor software, which provides Inmarsat SwiftBroadband high-speed data services.

The techniques of the present invention will be described in further detail as follows referring to the drawings.

FIG. 1 is a block diagram of a system 100 used to implement the techniques of the present invention according to one embodiment. The system 100 includes at least one multi-channel transmitter 110, at least one data receiver 112, and at least one antenna 114. For the case of a single antenna 114, the multi-channel transmitter 110 and data receiver 112 are in operative communication with antenna 114 through a transmit/receive coupler 116, such as a diplexer, circulator, or the like. The coupler 116 is configured to couple, combine, or split the transmit and receive communication signals to and from the single antenna 114.

In another embodiment, a multiple-antenna system can be employed, where one or more antennas is/are dedicated to transmit communications and one or more antennas is/are dedicated to receive communications. The use of separate transmit and receive antennas eliminates the need for the coupler.

The signals (Rx data) from receiver 112 are used as SQM data in the present method. The SQM data can be sent via a virtual switch 118 to a first Data Set 1 or a second Data Set 2, which can be stored in the same or separate storage devices, such as storage devices 120 and 122. The first and second Data Sets 1 and 2 are utilized by a data analysis algorithms module 126 having instructions executable by at least one processor 130 to carry out the method of the invention. The data analysis algorithms module 126 also provides data set selection control for virtual switch 118.

Various background data processes take place during the present data analysis method. In one background process, computation of possible (P)IM frequencies occurs. At discrete-time-continuously, or whenever a Tx frequency is added or deleted, all possible (P)IM product frequencies are computed that are desired to be monitored, based on all possible pairings of all currently-active and currently-assigned Tx frequencies. The terms "desired to be monitored" refers to those frequencies (F) that have been pre-determined to be potentially significant order (P)IM products, e.g., lower 7th and 9th order products (the choice being selectable). The following are example computation equations:

$$F_{7-} = 4F_L - 3F_H \text{ for the lower 7th order product;}$$

$$F_{9-} = 5F_L - 4F_H \text{ for the lower 9th order product;}$$

where $F_L$ and $F_H$ refer to the lower and higher frequencies, respectively, of a pair of transmit frequencies that may be causing (P)IM. The computed data is referred to herein as "possible (P)IM frequencies" (PPFs). In other applications, different orders of intermodulation, including high as well as low orders, or just high orders, can be of interest.

In another background process, Rx channel signal quality measurement occurs. At discrete-time-continuously (e.g., once per x ms, x being selectable, e.g., 100 ms), one or more signal quality/figure-of-merit parameters are measured for the Rx channel that has been chosen for (P)IM monitoring. Exemplary parameters include $C/N_o$, raw or net physical layer bit error rate (BER), bit sync, frame sync, superframe sync, data link layer or network layer cyclic redundancy code (CRC) check, etc. The measured data is referred to herein as "signal quality measurement" (SQM) data.

In a further background process, a determination is made of whether significant (P)IM interference is possible. At discrete-time-continuously, or whenever either the PPFs list or the monitored Rx frequency changes, the PPFs are compared against the currently-monitored Rx frequency, within a bandwidth of +/−y Hz (y being selectable, e.g., y=500, yielding +/−500 Hz, or a bandwidth of 1000 Hz). The result of this comparison is referred to herein as a "(P)IM hit." If one or more of the PPFs match the currently-monitored Rx frequency within +/−y Hz, then (P)IM hit=Yes.

Figure 2A:
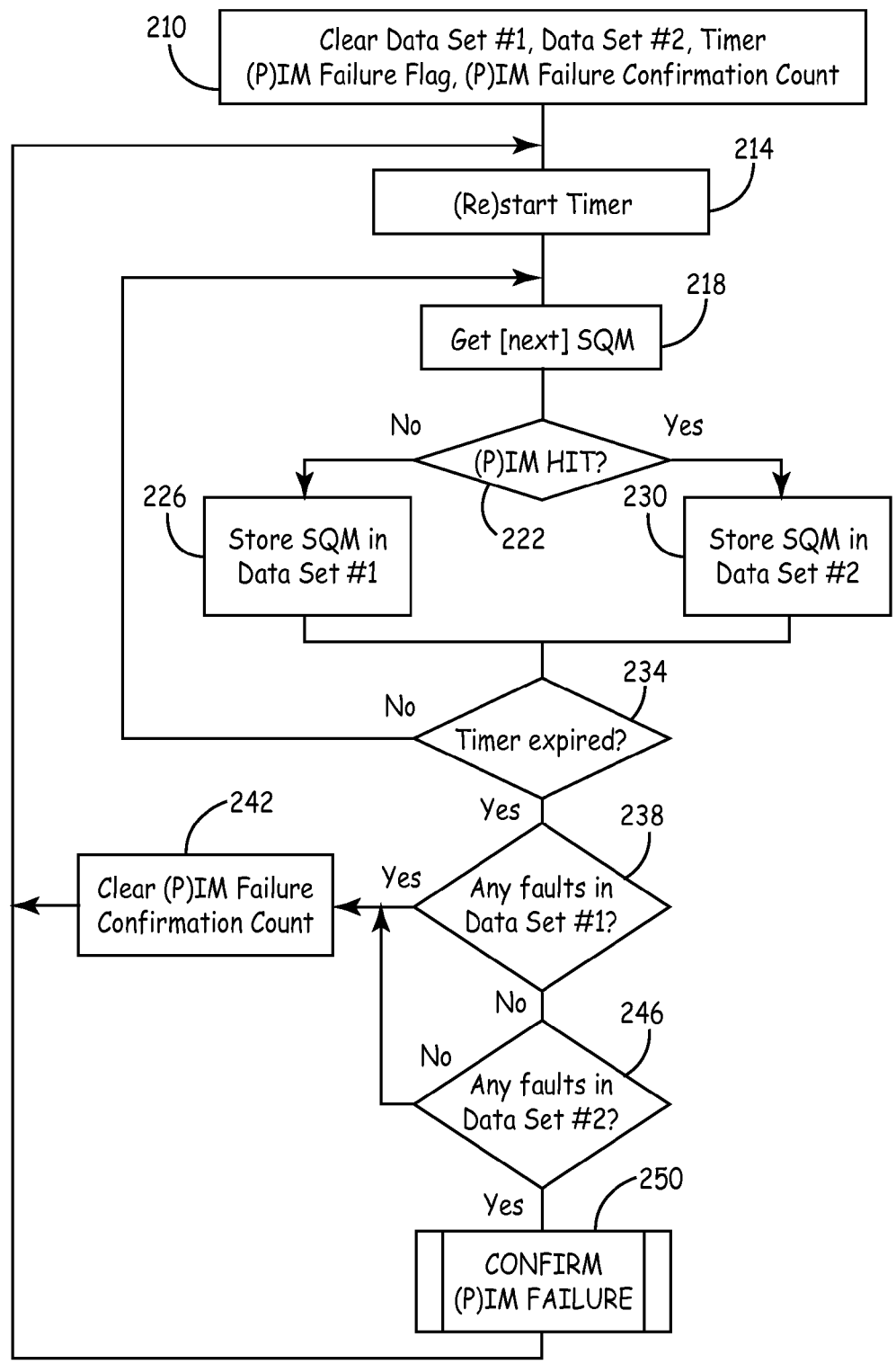
FIGS. 2A and 2B are process flow diagrams for data analysis algorithms used in the method of the invention according to one embodiment.
Figure 2B:
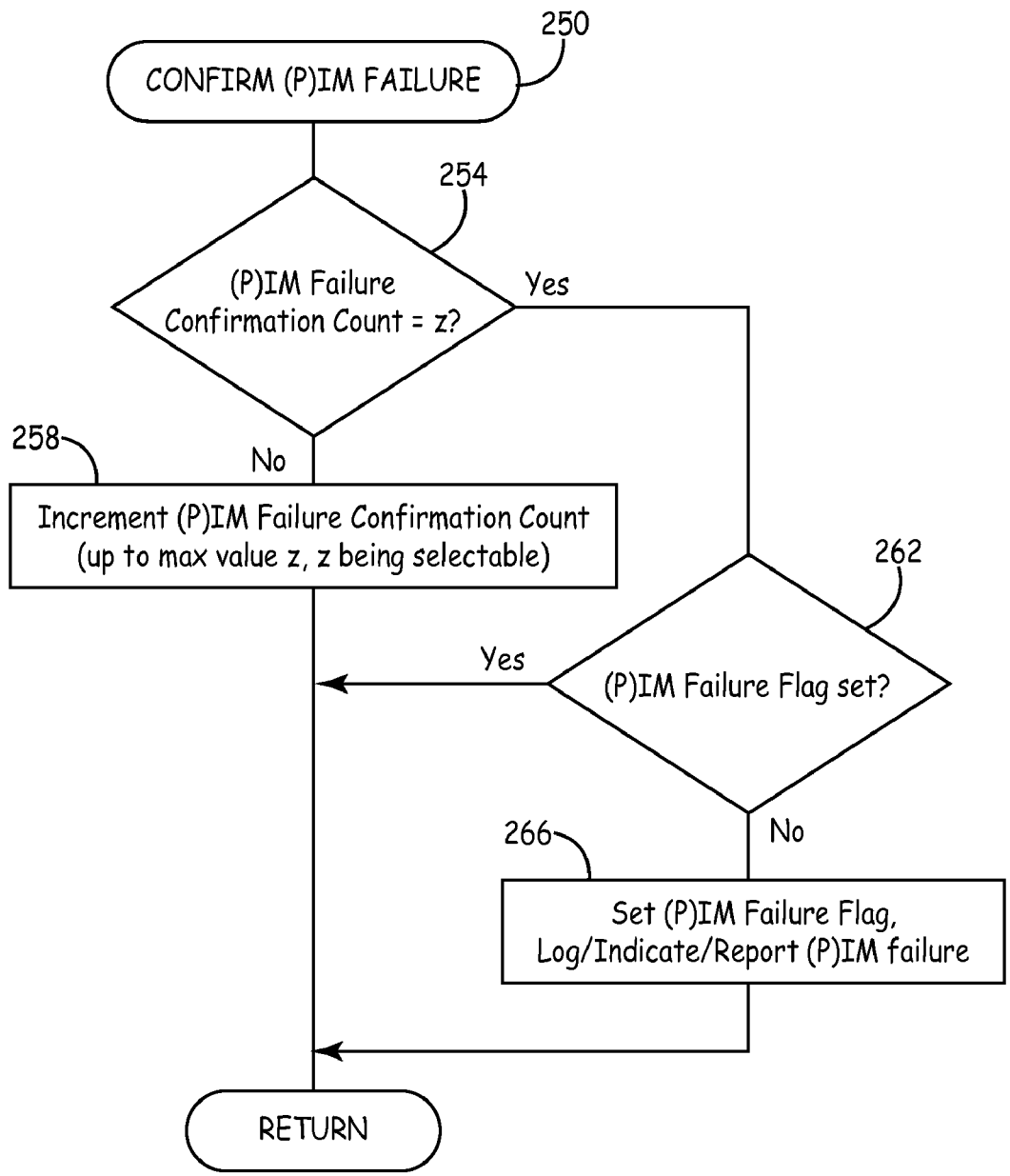

FIGS. 2A and 2B are process flow diagrams for the data analysis algorithms used in the method of the invention according to one embodiment. Referring to FIG. 2A, the Data Set 1, Data Set 2, timer, (P)IM failure flag, and (P)IM failure confirmation count are cleared (block 210). The timer is then started or restarted (block 214). The SQM data or next SQM data is then retrieved (block 218). The algorithm then determines if there is a (P)IM hit (block 222). If there is no hit, the SQM data is stored in Data Set 1 (block 226); if there is a hit, the SQM data is stored in Data Set 2 (block 230).

The algorithm then determines if the timer has expired (block 234). If the timer has not expired, the above steps are repeated starting at block 218. If the timer has expired, the algorithm determines if there are one or more faults in Data Set 1 (block 238). If there is a fault(s), the (P)IM failure confirmation count is cleared (block 242) and the process returns to block 214. A "fault" means one or more of the SQM data exceeded its pre-determined exceedance thresholds (settable values) during the measurement period. If there are no faults in Data Set 1, the algorithm determines if there are any faults in Data Set 2 (block 246). If there are no faults in Data Set 2, the (P)IM failure confirmation count is cleared (block 242) and the process returns to block 214 for further data analysis. If there is a fault(s) in Data Set 2, the algorithm confirms (P)IM failure (block 250). A "failure" means that the declared (P)IM fault condition has endured persistently enough to confirm that the condition requires a maintenance action. The process then returns to block 214 for further data analysis.

FIG. 2B shows further details of the "confirm (P)IM failure" step (block 250) according to one embodiment. A determination is made if the (P)IM failure confirmation count is equal to a selectable threshold value z (block 254). If not, the (P)IM failure confirmation count is incremented (up to a maximum value z) (block 258). The process then returns to block 214 (FIG. 2A) where the timer is restarted. If the (P)IM failure confirmation count is equal to the selectable threshold value z, a determination is made whether the (P)IM failure flag is set (block 262). If yes, the process returns to block 214 and the timer is restarted; if no, the (P)IM failure flag is set, and the (P)IM failure is logged/indicated/reported (block 266). The process then returns to block 214 and the timer is restarted.

It should be understood that many elaborations and refinements of the "confirm (P)IM failure" step are possible to provide for additional or higher-performance functionality. For example, processing and storing sets of SQM data (possibly reduced through, e.g., averaging) for further analysis, such as long-term human or automated trend indication, greater discrimination than just the mere existence of any fault conditions in Data Sets 1 and 2, etc., are possible with the present approach.

Instructions for carrying out the various process tasks, calculations, and generation of signals and other data used in the operation of the method of the invention can be implemented in software, firmware, or other computer-readable instructions. These instructions are typically stored on any appropriate computer-readable medium used for storage of computer-readable instructions or data structures. Such computer-readable media can be any available media that can be accessed by a general-purpose or special-purpose computer or processor, or any programmable logic device.

Suitable computer-readable media may comprise, for example, non-volatile memory devices including semiconductor memory devices such as EPROM, EEPROM, or flash memory devices; magnetic disks such as internal hard disks or removable disks; magneto-optical disks; CDs, DVDs, or other optical storage disks; nonvolatile ROM, RAM, and other like media; or any other media that can be used to carry or store desired program code in the form of computer-executable instructions or data structures. Any of the foregoing may be supplemented by, or incorporated in, specially-designed application-specific integrated circuits (ASICs), or field programmable gate arrays (FPGAs). When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above are also included within the scope of computer-readable media.

The method of the invention can be implemented in computer-readable instructions, such as program modules or applications, which are executed by a data processor. Generally, program modules or applications include routines, programs, objects, data components, data structures, algorithms, and the like, which perform particular tasks or implement particular abstract data types. These represent examples of program code means for executing steps of the method disclosed herein. The particular sequence of such executable instructions or associated data structures represent examples of corresponding acts for implementing the functions described in such steps.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A method for detecting intermodulation emissions, the method comprising:
   (a) retrieving signal quality measurement (SQM) data generated by a receiver without any test signal transmissions;
   (b) determining whether there is an intermodulation hit in associated with the SQM data, the intermodulation hit defined as a condition that exists when one or more potential intermodulation product frequency or frequencies from a current set of normal operation transmit frequencies coincide with one or more monitored normal operation receive frequency or frequencies;

(i) storing the SQM data in a first data set if there is no intermodulation hit; and
(ii) storing the SQM data in a second data set if there is an intermodulation hit;
(c) determining whether there are one or more faults in the first data set;
(i) clearing a confirmation count for an intermodulation failure if there are one or more faults in the first data set; and
(ii) returning to step (a) to restart the method;
(d) determining whether there are one or more faults in the second data set if there are not one or more faults in the first data set; and
(i) clearing the confirmation count if there are not one or more faults in the second data set; and
(ii) returning to step (a) to restart the method.

2. The method of claim 1, further comprising confirming an intermodulation failure if there are one or more faults in the second data set.

3. The method of claim 2, wherein confirming the intermodulation failure further comprises:
determining whether the confirmation count for the intermodulation failure is equal to a maximum selectable amount;
if the confirmation count is not equal to the maximum selectable amount:
incrementing the confirmation count to a next value; and
returning to step (a) to restart the method;
if the confirmation count is equal to the maximum selectable amount, determining whether a failure flag for the intermodulation failure is set;
if the failure flag is set, returning to step (a) to restart the method; or
if the failure flag is not set:
setting the failure flag;
reporting the intermodulation failure; and
returning to step (a) to restart the method.

4. The method of claim 3, further comprising:
clearing the first data set, the second data set, the failure flag, and the confirmation count prior to restarting a timer.

5. A computer program product, comprising:
a computer-readable medium having program instructions stored thereon for a method for detecting intermodulation emissions according to claim 1.

6. A computer program product, comprising:
a computer-readable medium having program instructions stored thereon for a method of detecting passive intermodulation emissions, the method comprising:
(a) retrieving signal quality measurement (SQM) data generated by a receiver without any test signal transmissions;
(b) determining whether there is a passive intermodulation hit associated with the SQM data, the passive intermodulation hit defined as a condition that exists when one or more potential intermodulation product frequency or frequencies from a current set of normal operation transmit frequencies coincide with one or more monitored normal operation receive frequency or frequencies;
(i) storing the SQM data in a first data set if there is no passive intermodulation hit; and
(ii) storing the SQM data in a second data set if there is a passive intermodulation hit;
(c) returning to step (a), if a timer has not expired, to restart the method;
(d) determining whether there are one or more faults in the first data set if the timer has expired;
(i) clearing a confirmation count for a passive intermodulation failure if there are one or more faults in the first data set; and
(ii) returning to step (a) to restart the method;
(e) determining whether there are one or more faults in the second data set if there are not one or more faults in the first data set; and
(i) clearing the confirmation count if there are not one or more faults in the second data set; and
(ii) returning to step (a) to restart the method;
(f) confirming a passive intermodulation failure if there are one or more faults in the second data set.

7. The computer program product of claim 6, wherein confirming the passive intermodulation failure further comprises:
determining whether a confirmation count for the passive intermodulation failure is equal to a selectable threshold value;
if the confirmation count is not equal to the selectable threshold value:
incrementing the confirmation count to a next value; and
returning to step (a) to restart the method;
if the confirmation count is equal to the selectable threshold value, determining whether a failure flag for the passive intermodulation failure is set;
if the failure flag is set, returning to step (a) to restart the method; or
if the failure flag is not set:
setting the failure flag;
reporting the passive intermodulation failure; and
returning to step (a) to restart the method.

8. The computer program product of claim 7, further comprising:
clearing the first data set, the second data set, the timer, the failure flag, and the confirmation count prior to restarting the timer.

9. The computer program product of claim 6, wherein the program instructions stored on the computer-readable medium are implemented as part of an avionics protocol module.

10. The computer program product of claim 6, wherein the program instructions stored on the computer-readable medium are implemented as part of a satellite navigation protocol module.

11. A system for detecting passive intermodulation emissions, the system comprising:
at least one data receiver that outputs signal quality measurement (SQM) data without any test signal transmissions;
at least one data storage device that saves the SQM data from the data receiver;
at least one data processor operatively coupled to the data storage device; and
a program module having instructions executable by the processor to:
(a) retrieve the SQM data from the storage device;
(b) determine whether there is a passive intermodulation hit associated with the SQM data, the passive intermodulation hit defined as a condition that exists when one or more potential intermodulation product frequency or frequencies from a current set of normal operation transmit frequencies coincide with one or more monitored normal operation receive frequency or frequencies;

(i) store the SQM data in a first data set if there is no passive intermodulation hit; and
(ii) store the SQM data in a second data set if there is a passive intermodulation hit;
(c) determine whether there are one or more faults in the first data set;
(i) clear a confirmation count for a passive intermodulation failure if there are one or more faults in the first data set; and
(ii) repeat instructions (a) to (c);
(d) determine whether there are one or more faults in the second data set if there are not one or more faults in the first data set;
(i) clear the confirmation count if there are not one or more faults in the second data set; and
(ii) repeat instructions (a) to (d);
(e) confirm a passive intermodulation failure if there are one or more faults in the second data set.

12. The system of claim 11, further comprising one or more antennas, wherein at least one antenna is in signal communication with the data receiver.

13. The system of claim 12, further comprising at least one multi-channel transmitter, wherein at least one antenna is in signal communication with the multi-channel transmitter.

14. The system of claim 13, further comprising a transmit/receive coupler when the same antenna is in signal communication with the data receiver and the multi-channel transmitter, the coupler configured to provide signal communication between the antenna and the transmitter or the receiver.

15. The system of claim 14, wherein the transmit/receive coupler comprises a diplexer or a circulator, the coupler configured to couple, combine, or split transmit and receive communication signals to and from the antenna.

16. The system of claim 11, wherein the SQM data is sent to the first data set or the second data set from the data receiver via a virtual switch controlled by the processor.

17. The system of claim 11, wherein the instructions to confirm the passive intermodulation failure further comprises instructions to:
determine whether the confirmation count for the passive intermodulation failure is equal to a maximum selectable amount;
if the confirmation count is not equal to the selectable threshold value:
increment the confirmation count to a next value; and
repeat the instructions starting at step (a); or
if the confirmation count is equal to the selectable threshold value, determine whether a failure flag for the passive intermodulation failure is set;
if the failure flag is set, repeat the instructions starting at step (a); or
if the failure flag is not set:
set the failure flag;
report the passive intermodulation failure; and
repeat the instructions starting at step (a).

18. The system of claim 17, wherein the program module comprises further instructions to:
clear the first data set, the second data set, the failure flag, and the confirmation count prior to restarting a timer.

19. The system of claim 11, wherein the program module is implemented as part of an avionics protocol module on an aircraft.

20. The system of claim 11, wherein the program module is implemented as part of a satellite navigation protocol module on a satellite.

* * * * *

UNITED STATES PATENT AND TRADEMARK OFFICE
CERTIFICATE OF CORRECTION

PATENT NO. : 8,369,812 B2
APPLICATION NO. : 12/366412
DATED : February 5, 2013
INVENTOR(S) : Lehman Page 1 of 1

It is certified that error appears in the above-identified patent and that said Letters Patent is hereby corrected as shown below:

In the Claims:

At Column 6, Line 61-62, replace "intermodulation hit in associated" with
-- intermodulation hit associated --

Signed and Sealed this
Twenty-fifth Day of June, 2013

Teresa Stanek Rea
*Acting Director of the United States Patent and Trademark Office*